May 26, 1925.
C. H. STANSELL
POWER DRIVEN SCREW DRIVER
Filed Oct. 8, 1923
1,539,782
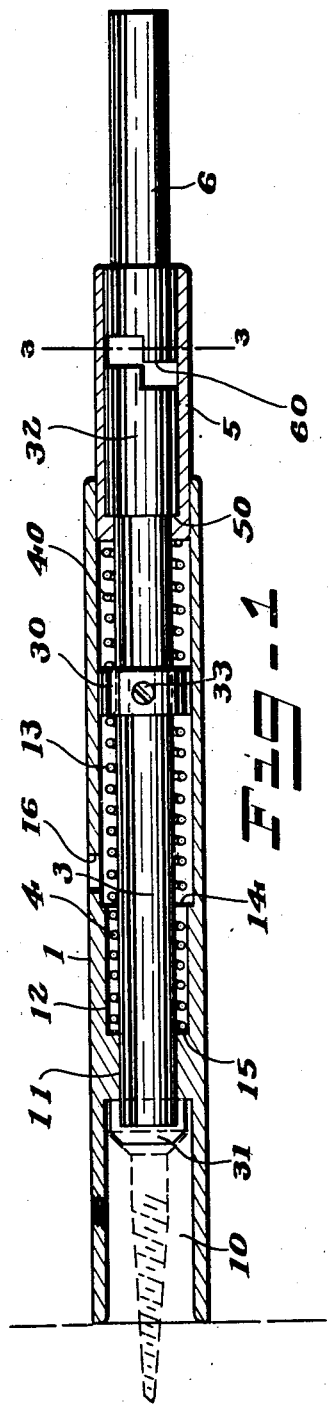
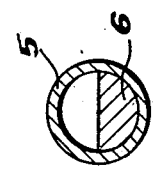
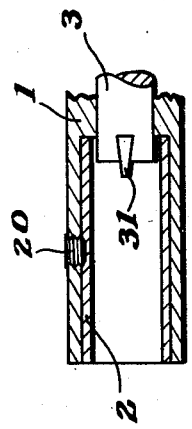
Inventor
Clyde H. Stansell
By H.L. & C. L. Reynolds
Attorneys Patented May 26, 1925.

1,539,782

UNITED STATES PATENT OFFICE.

CLYDE H. STANSELL, OF RENTON, WASHINGTON.

POWER-DRIVEN SCREW DRIVER.

Application filed October 8, 1923. Serial No. 667,210.

*To all whom it may concern:*

Be it known that I, CLYDE H. STANSELL, a citizen of the United States of America, and resident of the city of Renton, in the county of King and State of Washington, have invented certain new and useful Improvements in Power-Driven Screw Drivers, of which the following is a specification.

My invention relates to power driven devices for turning down screws.

The object of my invention is to provide a simple device which may be connected with a suitable type of power driven motor and by means of which screws may be rapidly turned down.

Another object of my invention is to enable the workman to do more work in the same time, and to do it easier than by any form of hand operated or driven screw driver.

In the accompanying drawings I have shown my invention embodied in the form of construction which I prefer to use.

The features of such invention which I believe to be new and upon which I desire to secure a patent will be specifically defined in the claims terminating this specification.

Figure 1 is a longitudinal section through the device, the screw driver shank and its extension being, however, not in section.

Figure 2 is a section of the socket or screw-receiving end, showing how the diameter of the socket may be adjusted for screw heads of different sizes.

Figure 3 is a section taken on the line 3—3 of Figure 1.

In my device an outer tubular casing 1 is employed, this being provided with interior bores which vary in diameter at different points to accommodate the other parts of the device. At one end a section 10 of this bore, extending from the end and inward a sufficient distance to accommodate the length of the ordinary screw which it is desired to use the device upon, is made of a diameter sufficient to accommodate the head of the screw. For convenient operation it is desirable that the diameter of this socket be quite closely approximated to the diameter of the head of the screw, being sufficiently larger to freely receive the head of the screw. If the device is to be used upon screws having smaller heads, the effective diameter of this socket may be varied by the insertion of a bushing or sleeve 2, as is shown in Figure 2, this being secured in place by a set screw 20.

Immediately inward from the end of the section 10 which receives the screw, is a bearing section 11 of a size to furnish a satisfactory bearing for the screw driver shank 3. Next inward from this bearing section is a section 12, which is sufficiently larger than the diameter of the screw driver shank 3 to accommodate between its walls and the shank a spring 4, by which the screw driver shank is normally withdrawn into the casing or shell 1. A section 13 of slightly larger bore, is provided, extending from the section 12 to the other or outer end of the shell 1. This provides a shoulder or ledge 14 against which a collar 30, secured upon the screw driver shank 3, may be seated.

The screw driver shank 3 is provided in its inner end or that which engages with the screw, with a bit 31 which is designed to enter the slot in the head of the screw in order to turn it. This bit should preferably be securely anchored in position so that it cannot be removed during use. A preferred means for doing this is to make the slot and the key of such transverse cross section that a dovetail effect is secured, as is clearly illustrated in Figure 2. It is also preferred that the bit 31 be slightly longer than the diameter of the shank 3, thereby forming a stop engaging the shoulder at the inner end of the socket section 10 and thereby preventing withdrawal of the screw driver shank. Removal of this bit, which may be done by sufficiently projecting the end of the shank 3, will permit entire removal of the screw driver shank through the opposite end of the shell. The opposite or outer end of the screw driver shank 3 is provided with a section 32 of slightly larger diameter. This is surrounded by a sleeve 5, which at its inner end is provided with an inwardly extending flange 50 adapted to engage the shoulder formed at the point where the shank is increased in diameter, to prevent separation of the two. The sleeve 5 should, however, have a free sliding and turning fit upon the shank 3.

In the outer end of the sleeve 5, and fixedly secured thereto, as by making the two a tight driving fit or by using equivalent securing means, is a shank extension 6. This is the part with which connection is made to the motor by which the screw driver is turned. The adjacent abutting ends of the shank 3 and the extension 6 are so shaped as to constitute clutch driving members. If these be held closely together, the extension 6 and the shank 3 are locked so as to be turned together. This is preferably done by cutting across the ends of each so as to remove substantially half of their cross section, as is clearly illustrated in Figures 1 and 3.

A spring 13 surrounds that portion of the shank 3 lying between the collar 30 and the ledge or shoulder 15. This spring normally acts to withdraw the shank 3. Between the collar 30 and the inner end of the sleeve 5 is another spring 40. The action of this spring is to force outwardly the sleeve 5. This spring thus acts to separate the shank 3 and its extension 6 and to thereby separate the clutch pieces at their adjacent ends. In this condition the screw driver is not turning, although the extension 6 is turning.

The spring 40 by which the parts of the clutch are separated, is designed to be relatively stronger than the spring 4 by which the shank is withdrawn. In consequence of endwise pressure transmitted through the shank extension 6, the first action is to engage the bit 31 with the screw head before the clutch parts are engaged.

I have shown the collar 30 as secured to the shank 3 by a set screw 33. I have also shown the shell 1 as having a hole 16 so placed that when the screw driving shank is forced to one end of its chamber and suitably turned, the set screw 33 is made accessible through the hole 16, whereby its position upon the shank 3 may be adjusted so as to thereby adjust the time of release of the screw.

The position of the collar 30 upon the shank 3 is determined by the level to which the screw head is to be set. If it is to be set flush with the surface, the collar should be positioned so that when it is seated upon the ledge or shoulder 14 the bit 31 will project very little beyond the end of the barrel or casing 1. The forward movement of the shank 3 is thus stopped while the screw continues movement until the engagement of the bit 31 therewith is insufficient to further turn it. If the screw is to be countersunk, the collar is set to permit projection of the bit from the casing 1 the amount of the countersink. The ledge 14 and the adjustable collar 30 make possible automatic disengagement from the screw and an adjustment whereby the position of the screw when this occurs may be varied.

What I claim as my invention is:

1. A power driven screw driver comprising a tubular shell having in one end a screw receiving socket, a shank journaling section of reduced diameter inwardly adjacent to said screw receiving socket, the remainder of the shell having a section next to the journal section enlarged to receive a spring outside of the shank and a major section of slightly larger bore extending to its other end, a screw driving shank within the shell and fitting the bearing section, a collar upon the shank within the major section, a separate shank extension and a sleeve secured thereto and fitting the outer end of the bore in the shell, the shank having an enlarged outer end fitting said sleeve and the sleeve having a flange at its inner end preventing withdrawal of the shank, the shank and shank extension having end faces interlocking by endwise movement to form a driving clutch and a spring at each side of the collar acting one to withdraw the screw-engaging end of the shank into the shell and the other to disengage the driving clutch.

2. A power driven screw driver comprising a tubular casing, a screw driver shank adapted to turn and slide endwise therein, a collar adjustable along said shank, a shank extension having with the shank complemental clutch members and relatively movable to engage and disengage the two, a spring at each side of the collar, one having a thrust bearing from the shank extension and the other from the casing, and a stop carried by the casing and engageable by the collar to limit the advancing movement of the screw driver shank.

Signed at Renton, King County, Washington, this 18th day of September, 1923.

CLYDE H. STANSELL.